US009705156B2

(12) United States Patent
Dorsch

(10) Patent No.: US 9,705,156 B2
(45) Date of Patent: Jul. 11, 2017

(54) METHOD FOR MANUFACTURING LITHIUM-ION BATTERY MODULES AND A CORRESPONDING LITHIUM-ION BATTERY MODULE

(71) Applicant: Robert Bosch GmbH, Stuttgart (DE)

(72) Inventor: Niko Dorsch, Leonberg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/397,744

(22) PCT Filed: Mar. 11, 2013

(86) PCT No.: PCT/EP2013/054892
§ 371 (c)(1),
(2) Date: Oct. 29, 2014

(87) PCT Pub. No.: WO2013/164119
PCT Pub. Date: Nov. 7, 2013

(65) Prior Publication Data
US 2015/0104693 A1 Apr. 16, 2015

(30) Foreign Application Priority Data

Apr. 30, 2012 (DE) .................. 10 2012 207 162

(51) Int. Cl.
*H01M 10/0525* (2010.01)
*H01M 2/02* (2006.01)
*H01M 2/10* (2006.01)
*H01M 2/34* (2006.01)
*H01M 10/04* (2006.01)

(52) U.S. Cl.
CPC ..... *H01M 10/0525* (2013.01); *H01M 2/0245* (2013.01); *H01M 2/105* (2013.01); *H01M 2/1061* (2013.01); *H01M 2/345* (2013.01); *H01M 10/0404* (2013.01); *Y10T 29/49108* (2015.01)

(58) Field of Classification Search
CPC .............................................. H01M 10/0525
See application file for complete search history.

(56) References Cited

U.S. PATENT DOCUMENTS

| 2006/0286441 | A1 | 12/2006 | Matsuoka et al. |
| 2010/0209759 | A1 | 8/2010 | Rejman et al. |
| 2010/0247998 | A1* | 9/2010 | Hostler ............... H01M 2/1077 429/120 |
| 2011/0151304 | A1 | 6/2011 | Joswig et al. |

(Continued)

FOREIGN PATENT DOCUMENTS

| DE | 10 2008 031175 | 1/2010 |
| DE | 10 2009 010148 | 8/2010 |

(Continued)

*Primary Examiner* — Patrick Ryan
*Assistant Examiner* — Alex Usyatinsky
(74) *Attorney, Agent, or Firm* — Norton Rose Fulbright US LLP; Gerard Messina

(57) ABSTRACT

A method for manufacturing lithium-ion battery modules, including the following: positioning an elastic plastic device between at least two cells of a battery module; path-controlled compression of the at least two cells of the battery module and of the elastic plastic device situated between the at least two cells. Also described is a corresponding lithium-ion battery module.

11 Claims, 2 Drawing Sheets

(56) References Cited

U.S. PATENT DOCUMENTS

2011/0177377 A1    7/2011   Dube
2013/0209858 A1*   8/2013   Schmitt ............. H01M 10/0525
                                                                                                    429/120

FOREIGN PATENT DOCUMENTS

| DE | 10 2009 040147 | | 3/2011 |
| --- | --- | --- | --- |
| JP | 2007173030 | A | 7/2007 |
| JP | 2009170687 | A | 7/2009 |
| JP | 2012052285 | A | 3/2012 |
| JP | 2013187088 | A | 9/2013 |
| WO | 2011101391 | A1 | 8/2011 |
| WO | WO 2011101391 | * | 8/2011 |
| WO | 2012044934 | A1 | 4/2012 |
| WO | WO 2012/044934 | * | 4/2012 |

* cited by examiner a) Z F Z F Z b) B

METHOD FOR MANUFACTURING LITHIUM-ION BATTERY MODULES AND A CORRESPONDING LITHIUM-ION BATTERY MODULE

FIELD OF THE INVENTION

The present invention relates to a method for manufacturing lithium-ion battery modules and a corresponding lithium-ion battery module.

BACKGROUND INFORMATION

FIG. 3 shows a schematic diagram of the design of an exemplary configuration of mechanically clamped cells.

In FIG. 3, reference numeral 10 denotes a cover plate of an electronics system, 20 denotes a control electronics system, 30 denotes a laser-welded connecting rail, 40 denotes a connecting cover, 50 denotes a pressure band, 60 denotes a pressure plate, 70 denotes a prismatic lithium-ion cell, and reference numeral 80 denotes a cooling element.

It is believed to be understood that mechanical pressure may, under certain circumstances, positively influence the service life of lithium-ion cells.

Furthermore, mechanical compression is believed to have been used for mechanical fixation. The cells may also be compressed for the thermal contact for cooling those cells. Cells which are mechanically compressed particularly may be found in cell constructions which are configured to be particularly thin and light, for example, in pouch cells or in the slightly more rigid prismatic metal case cells.

According to DE 10 2009 010 148 A1, the related art is, for example, a conductor of a galvanic cell or a contact element for its contacting, which, at least in part, has a surface structure, which, in a force-fit bond between the conductor and a contact element, increases the pressure which the conductor and the contact element apply on each other.

It is also believed to be understood that elastic elements, such as, for example, elastic films, are often used for the path-controlled application of the load pressure.

SUMMARY OF THE INVENTION

A novel, robust and economical concept for applying the pressing forces is thus desirable. Here it is particularly to be taken into account that the cells become thicker and more round over their service life. Furthermore, a concept is to be used which is robust against fluctuations during the production process, which may result in differences in the thickness of the cell.

The object defined above may be achieved with the present invention by providing a method for manufacturing lithium-ion battery modules, which includes the following steps: positioning an elastic plastic device between at least two cells of a battery module; path-controlled compression of the at least two cells of the battery module and of the elastic plastic device situated between the at least two cells.

The present invention also provides a corresponding lithium-ion battery module.

Further exemplary embodiments are the subject matter of the respective further descriptions herein.

According to an exemplary embodiment, the elastic plastic device is an elastic plastic film, which only has a certain amount of elastic recovery. Using a purely elastic plastic film and thus no viscoelastic film, which shows a time-dependent plastic behavior, results in the following advantages:

The plastic component of the film compensates for variations in thickness of the cell, which may occur after the manufacturing process. Breathing of the cell, the expanding and contraction of the cell thickness during charging and discharging of the cell, is compensated for by the elastic component and is thus largely independent of the total compression of the film. The plastic component compensates for the cell growing with age, so that the pressure applied to the cell increases only minimally. The plasticity compensates for irregularities on the surface of the cell, for example, the round shape, and the cell is subjected to uniform load.

According to an exemplary embodiment, where the elastic plastic film is expanded graphite, the advantage results that the expanded graphite has excellent thermal conductivity and thus positively influences the temperature control of the cell.

According to an exemplary embodiment, where the shape of the cells is round, this results in the advantage of a good thermal connection.

According to an exemplary embodiment, where a purely plastic film is used and the elastic properties are provided by at least one elastic element, this results in the advantage that a plurality of materials may be used for the method according to the present invention.

Further features and advantages of specific embodiments of the present invention result from the following description with reference to the appended drawings. Identical reference numerals denote identical or functionally identical elements.

BRIEF DESCRIPTION OF THE DRAWINGS

FIG. 1a shows a schematic diagram of a lithium-ion battery module manufactured according to one specific embodiment of the present invention.

FIG. 1b shows a schematic diagram of the housing of a lithium-ion battery module according to FIG. 1a.

DETAILED DESCRIPTION

Figure 3:
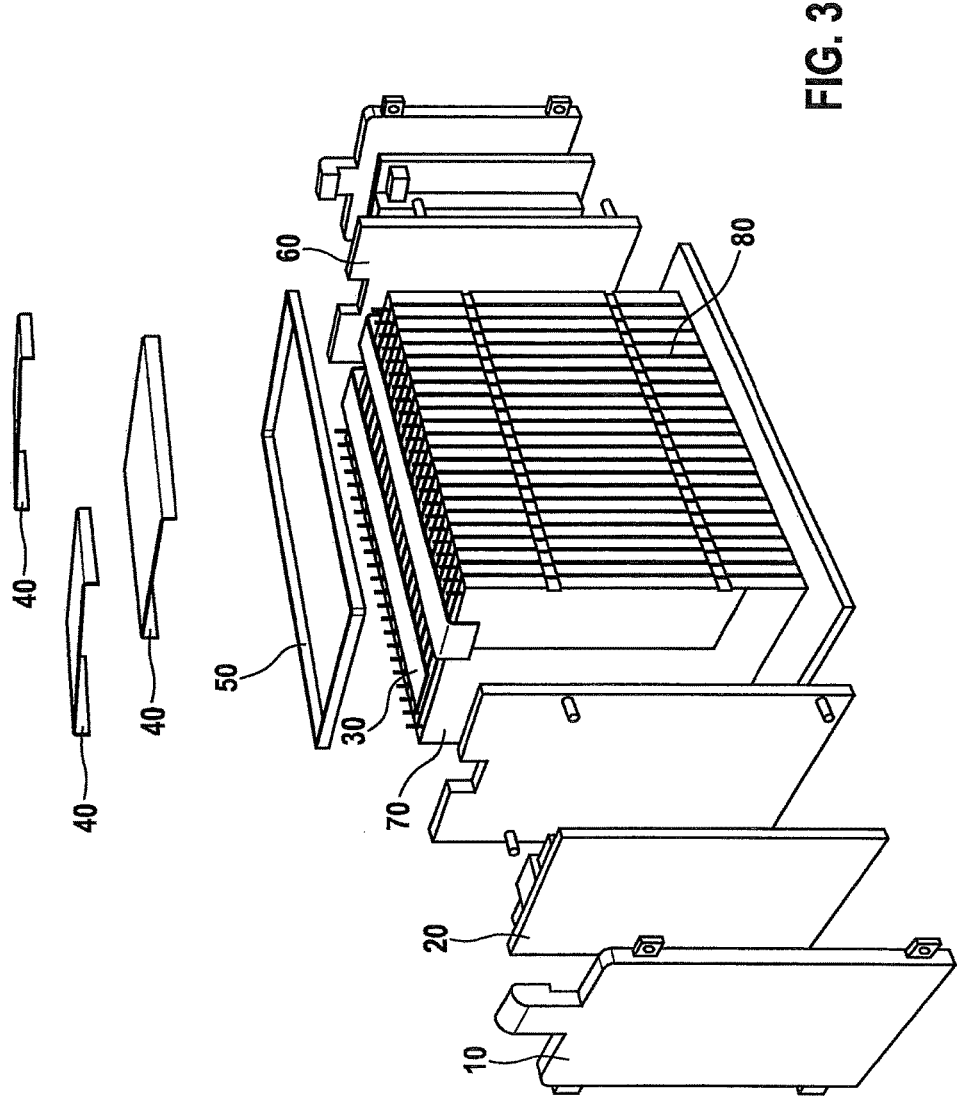
FIG. 3 shows a schematic diagram of the design of an exemplary configuration of mechanically clamped cells.

FIG. 3 shows a schematic diagram of the design of an exemplary configuration of mechanically clamped cells.

In FIG. 3, reference numeral 10 denotes a cover plate of an electronics system, 20 denotes a control electronics system, 30 denotes a laser-welded connecting rail, 40 denotes a connecting cover, 50 denotes a pressure band, 60 denotes a pressure plate, 70 denotes a prismatic lithium-ion cell, and reference numeral 80 denotes a cooling element.

Figure 1:
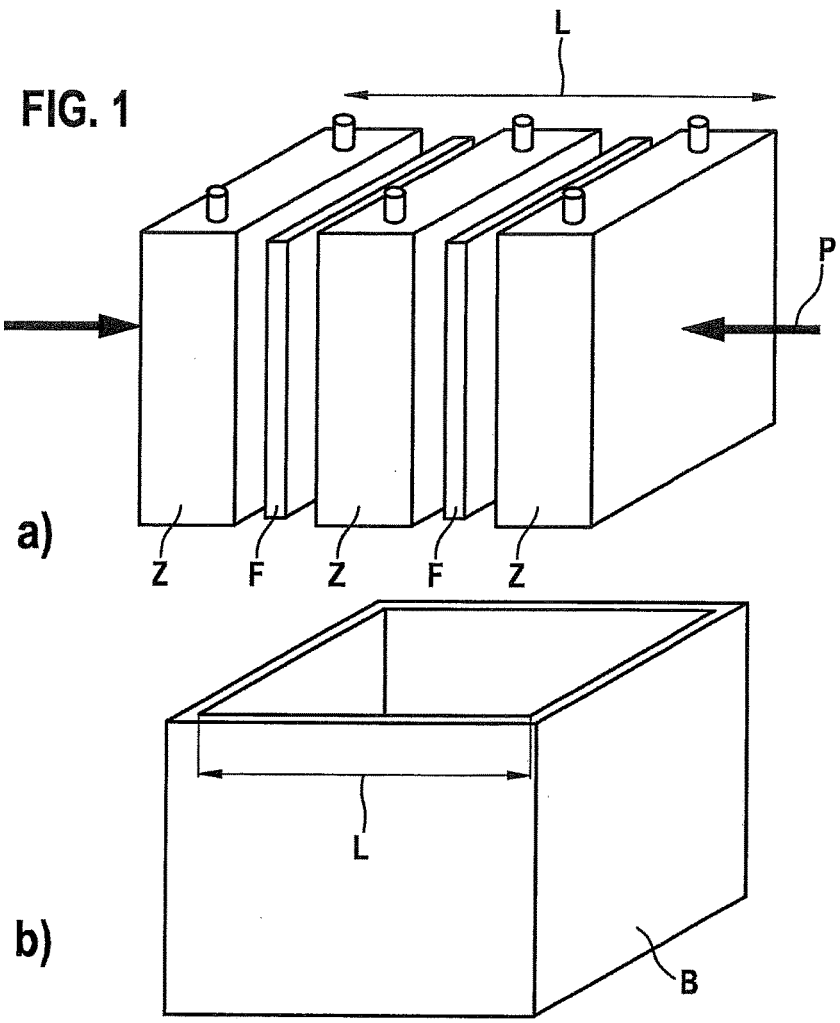

FIG. 1a shows a schematic diagram of a lithium-ion battery module, manufactured according to one specific embodiment of the method according to the present invention, and FIG. 1b) shows a schematic diagram of the housing of a lithium-ion battery module manufactured according to one specific embodiment of the method according to the present invention.

In FIGS. 1a and 1b, reference symbol Z denotes a cell of a battery module. Reference symbol F denotes an elastic plastic film, and L is the longitudinal expansion of the entire system of cells and films. B denotes the battery module. P denotes the direction in which the path-controlled compressing process is carried out.

According to one first specific embodiment of the method according to the present invention, an elastic plastic film F, for example made from expanded graphite, is placed between the, generally, prismatic cells Z of a battery module.

When compressing the stack, an increasing amount of pressure is applied to elastic plastic film F, which yields plastically when a pressure set by the material properties of film F is exceeded. The stack of cells Z and elastic plastic film F is compressed path-controlled.

'Path-controlled' is to be understood as the compression process being carried out along a set path P up to a defined endpoint.

In another advantageous specific embodiment of the method according to the present invention, other elastic plastic films F may be used, which are not made from expanded graphite.

Figure 2:
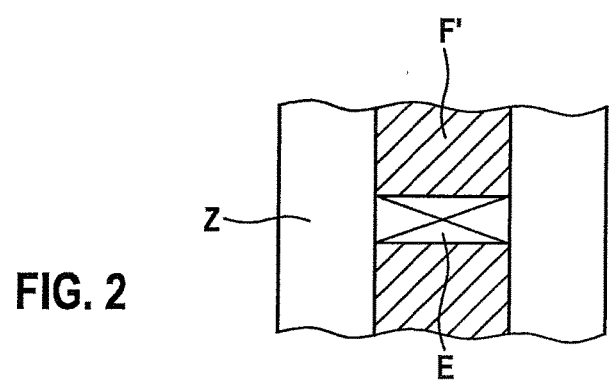
FIG. 2 shows a schematic diagram of a lithium-ion battery module manufactured according to another specific embodiment of the method according to the present invention.

FIG. 2 is a schematic diagram of a lithium-ion battery module manufactured according to another specific embodiment of the method according to the present invention.

In FIG. 2, reference symbol Z denotes a cell of the battery module. Reference symbol F' denotes a plastic film and reference symbol E denotes an elastic element, for example a spring.

In particular, the method according to the present invention may also be applied to round cells Z with a good thermal connection.

Although the present invention has been described with reference to exemplary embodiments, it is not limited thereto. The mentioned materials and topologies in particular are only exemplary and not limited to the above-explained examples.

What is claimed is:

1. A method for manufacturing a lithium-ion battery module, the method comprising:
   positioning an elastic plastic device between at least two cells of a prismatic cell stack of a battery module; and
   providing path-controlled compression of the at least two cells of the battery module, and of the elastic plastic device situated between the at least two cells; and
   providing a pressure band, a pressure plate and a cooling element;
   wherein the path-controlled compression is provided in a longitudinal direction L of the lithium-ion battery module and is carried out along a set path P up to a defined endpoint, and
   wherein the longitudinal direction L and the set path P are arranged parallel to each other, and
   wherein a plastic component of the elastic plastic device is configured to compensate for variation in a thickness of the cells as the cells age after the cells are manufactured, if at least two compressed cells become thicker.

2. The method of claim 1, wherein a plurality of cells, each including an elastic plastic device, is path-controlled compressed between two adjoining cells.

3. The method of claim 1, wherein the elastic plastic device is an elastic plastic film.

4. The method of claim 3, wherein the elastic plastic film is expanded graphite.

5. The method of claim 1, wherein the shape of the cells is at least one of prismatic and round.

6. The method of claim 1, wherein the elastic plastic device used is a purely plastic film in combination with at least one elastic element.

7. A lithium-ion battery module, comprising:
   at least two compressed cells of a prismatic cell stack; and
   an elastic plastic device situated between the at least two cells;
   wherein there is a path-controlled compression of the at least two cells of the battery module, and of the elastic plastic device situated between the at least two cells,
   wherein the path-controlled compression is provided in a longitudinal direction L of the lithium-ion battery module and is carried out along a set path P up to a defined endpoint,
   wherein the longitudinal direction L and the set path P are arranged parallel to each other, and
   wherein the module includes a pressure band, a pressure plate and a cooling element, and
   wherein a plastic component of the elastic plastic device is configured to compensate for variation in a thickness of the cells as the cells age after the cells are manufactured, if at least two compressed cells become thicker.

8. The lithium-ion battery module of claim 7, wherein the elastic plastic device is an elastic plastic film.

9. The lithium-ion battery module of claim 8, wherein the elastic plastic film is expanded graphite.

10. The lithium-ion battery module of claim 7, wherein the shape of the cells is at least one of prismatic and round.

11. The lithium-ion battery module of claim 7, wherein a purely plastic film is used in combination with at least one elastic element as the elastic plastic device.

\* \* \* \* \*